United States Patent [19]
Deller

[11] 3,926,530
[45] Dec. 16, 1975

[54] INTEGRAL CLIP CROSSMEMBER
[75] Inventor: Robert J. Deller, Cincinnati, Ohio
[73] Assignee: Pullman Incorporated, Chicago, Ill.
[22] Filed: Aug. 19, 1974
[21] Appl. No.: 498,807

[52] U.S. Cl................................. 403/167; 52/664
[51] Int. Cl.² ...................................... B62D 27/00
[58] Field of Search...... 296/28 M, 29; 52/664, 729, 52/696, 666, 758 A, 758 R, 753 H; 403/262, 167, 168

[56] References Cited
UNITED STATES PATENTS

| | | | |
|---|---|---|---|
| 893,815 | 7/1908 | Schutt................................. | 52/696 |
| 1,663,487 | 3/1928 | Smith et al........................ | 52/758 G |
| 2,788,223 | 4/1957 | Mersheimer et al............ | 280/106 R |
| 3,141,697 | 7/1964 | Tenenbaum et al............ | 296/28 M |
| 3,692,349 | 9/1972 | Ehrlich............................ | 296/28 M |

Primary Examiner—Andrew V. Kundrat
Attorney, Agent, or Firm—Richard J. Myers

[57] ABSTRACT

An integral clip crossmember reinforcement means for supporting and securing a crossmember between a pair of longitudinally extending side members in an over-the-highway trailer chassis where the crossmember, extending transversely between and connecting a pair of side members, has an upright transverse web and a clip at each end of the web extending outwardly therefrom, each clip having a connecting portion joining with a respective end of the crossmember and an outer end attachment portion, the outer end attachment portion being couplable with a respective side member and including fastening means attaching the attachment portion to the side member and the connecting portion including a substantially horizontally extending strengthening rib means.

2 Claims, 4 Drawing Figures

INTEGRAL CLIP CROSSMEMBER

BACKGROUND OF THE INVENTION

1. Field of the Invention

The field of art to which this invention pertains is the highway trailer art and in particular relates to a means of strengthening a crossmember in the proximity of the structural interface of a pair of longitudinally extending side members and each end of a crossmember secured therebetween.

2. Description of the Prior Art

It is well known in the prior art to secure crossmembers transversely between a pair of longitudinally extending side members. A variety of securing means have been used for this purpose. One design approach has been to provide a three-piece crossmember having a beam member and an attachment clip fastened at each end of the beam with rivets. The attachment clips are then riveted to the respective side members to transversely secure the crossmember between the side members. A further crossmember design approach is to structurally integrate the beam member and clips by utilizing an I-beam having a web section longitudinally outstanding from and formed into a clip on each end of the beam. While this structure eliminates the inherent load bearing limitation of the riveted three-piece crossmember, it clearly makes no provision for any improvement in the load bearing capacity of the clip itself. Considering the substantial shearing loads on the crossmember clip during use of the trailer, such a provision is essential to the structural integrity of the trailer chassis.

SUMMARY

This invention relates to a crossmember side member attachment clip reinforcement means and, more particularly, to an integral crossmember clip reinforcement means for supporting and securing a crossmember transversely between a pair of longitudinally extending side members in an over-the-highway trailer chassis.

It is a general object of this invention to provide a reinforcement means in the clip supporting and securing each end of a crossmember to its respective side member.

It is another object of this invention to provide attachment means for a crossmember wherein the attachment means is in the form of clips having reinforcement means therein to strengthen the clips.

A further object of the invention is to provide an integral clip crossmember wherein a substantially horizontally extending strenghtening rib means is provided in each clip and wherein each clip is continuous of the crossmember structure.

These and other objects will become apparent from reference to the following description, attached drawings and appended claims.

DESCRIPTION OF THE PREFERRED EMBODIMENT

Figure 1:
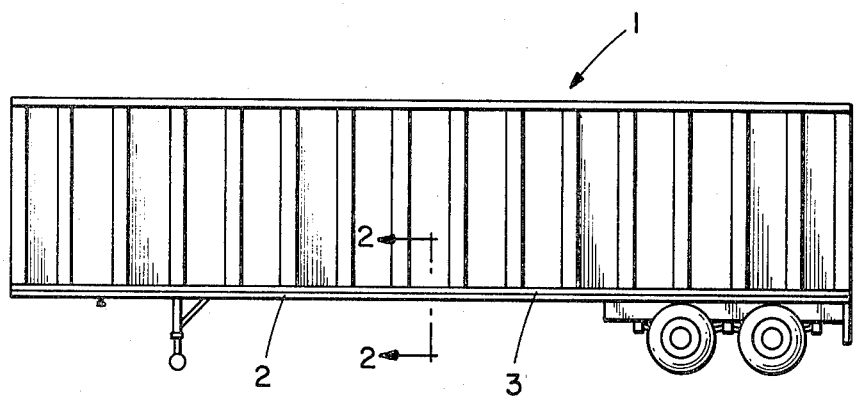
FIG. 1 is a side elevational view of a trailer arrangement incorporating an integral clip crossmember in the trailer chassis.
Figure 2:
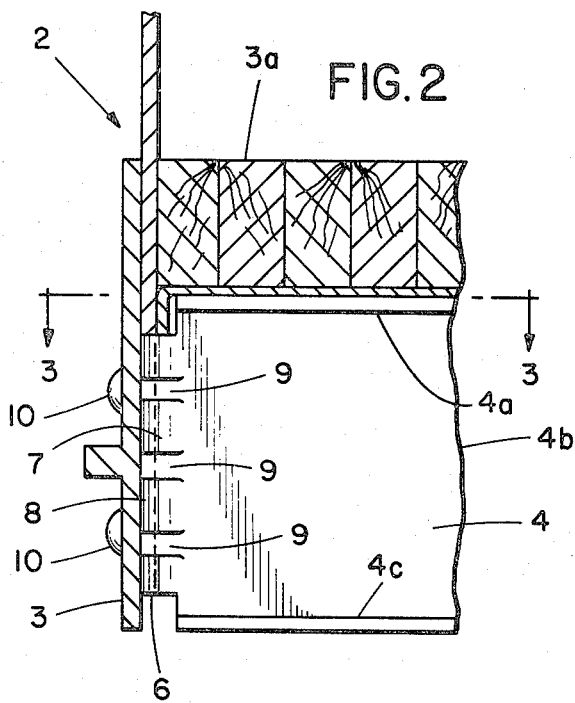
FIG. 2 is a cross sectional view at line 2—2 of FIG. 1 which shows the integral clip crossmember secured to the side member of the trailer chassis.

With reference to the drawings and specifically with reference to FIGS. 1 and 2, there shown is a trailer 1 having a trailer underframe or chassis 2 which includes a pair of transversely spaced longitudinally extending side members 3 and a crossmember 4 transversely secured between the side members 3. The crossmember 4 supports a floor 3a. In a typical trailer underframe or chassis 2, a plurality of longitudinally spaced crossmembers 4 are secured between the side members 3.

Figure 3:
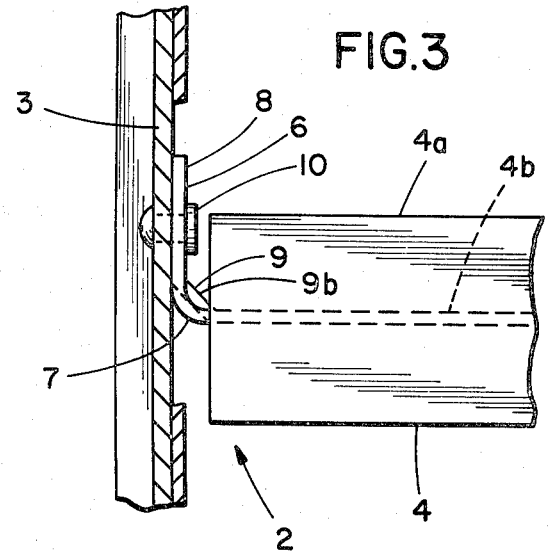
FIG. 3 is a sectional plan view shown at line 3—3 in FIG. 2.
Figure 4:
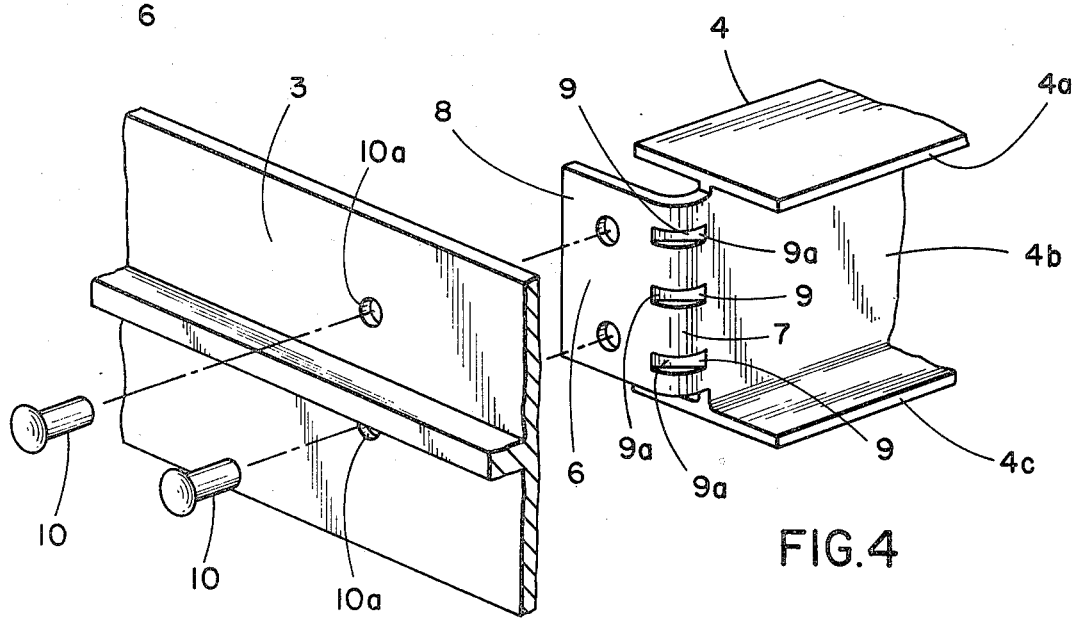
FIG. 4 is an exploded isometric view showing the integral clip crossmember attached to a side member.

FIGS. 3 and 4 more particularly set out the structure of the crossmember 4 and its structural interface with the side member 3. The crossmember 4 has a substantially upright transverse web 4b and a generally horizontally extending top flange 4a and a bottom flange 4c. Extending outwardly from the web 4b from each end of the crossmember 4 is a side member attachment clip member 6 including a connecting or bent portion 7 and an outer end attachment portion 8 which may be secured to the holes 10a of the side member 3 by fastening means 10 such as rivets or other appropriate means. Additionallly, although not limited thereto, the attachment portion 8 of the clip member 6 is substantially perpendicular to the web 4b; and further, the entire clip structure is a continuous integral unit of the web 4b. Considering the continuous integral structure of the clip member 6 and the web 4b, it should be particularly noted that the connecting or bent portion 7 is radially formed to insure continuous stress distribution through its horizontal bend radius.

Now turning to consideration of the integral crossmember reinforcement means disclosed by the invention, as shown in FIGS. 3 and 4, a plurality of horizontally extending strengthening ribs 9 are provided to reinforce the bent portion 7 of the clip 6. In the preferred embodiment of the invention, each strengthening rib 9 is substantially horizontally extending or substantially parallel to the top flange 4a and the lower flange 4c. Additionally, as disclosed by the drawings, the rib 9 is diagonally disposed between and generally intersecting the attachment portion 8 and web 4b at a 45° angle. Further, to maintain and assure the structural integrity of the clip member 6 as a continuous integral unit of the web 4b, each strengthening rib 9 is formed of an indented portion in the bent portion 7 defining a recess on one side as shown at 9a in FIG. 4, and a complementary protuberance 9b on the other side of the bent portion.

From the above it can be seen that the strengthening rib feature and the continuous integral structure of the clip member 6 and web 4b substantially improve the shear load bearing capacity of the trailer chassis. Similarly, because the integral clip cross-member is of one-piece construction, it is lighter and simpler to manufacture than earlier three-piece designs and stronger than any existing one-piece designs of the same size and material that fail to incorporate the strengthening rib concept.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. For an over-the-highway trailer chassis having longitudinally extending side members, a crossmember extending transversely therebetween and connecting with each side member, said crossmember including an upright transverse web and a clip member at each end of the web for connecting with a respective side member, each clip member extending outwardly from the web and including a connecting portion joining with a respective end of the crossmember and an outer end attachment portion couplable with a respective side member being joined to the connecting portion, said connecting portion including a plurality of substantially horizontally extending and vertically spaced strengthening ribs, said attachment portion including fastening means attaching said attachment portion to the respective side member, said connecting portion being a radially formed and smoothly curved bent portion and said attachment portion being substantially perpendicular to said web, said bent portion having substantially a 90° curved bend with said ribs being formed within the arcuate limits of said bend curve and generally intersecting said attachment portion and said web generally at 45°.

2. The invention according to claim 1, and said crossmember having top and bottom generally horizontal flanges and said ribs being generally parallel to said top and bottom flanges.

* * * * *